Sept. 18, 1923.  W. E. PRIMROSE  1,468,511
WIRE FEEDING AND CUTTING-OFF MECHANISM
Filed Jan. 31, 1921  2 Sheets-Sheet 2
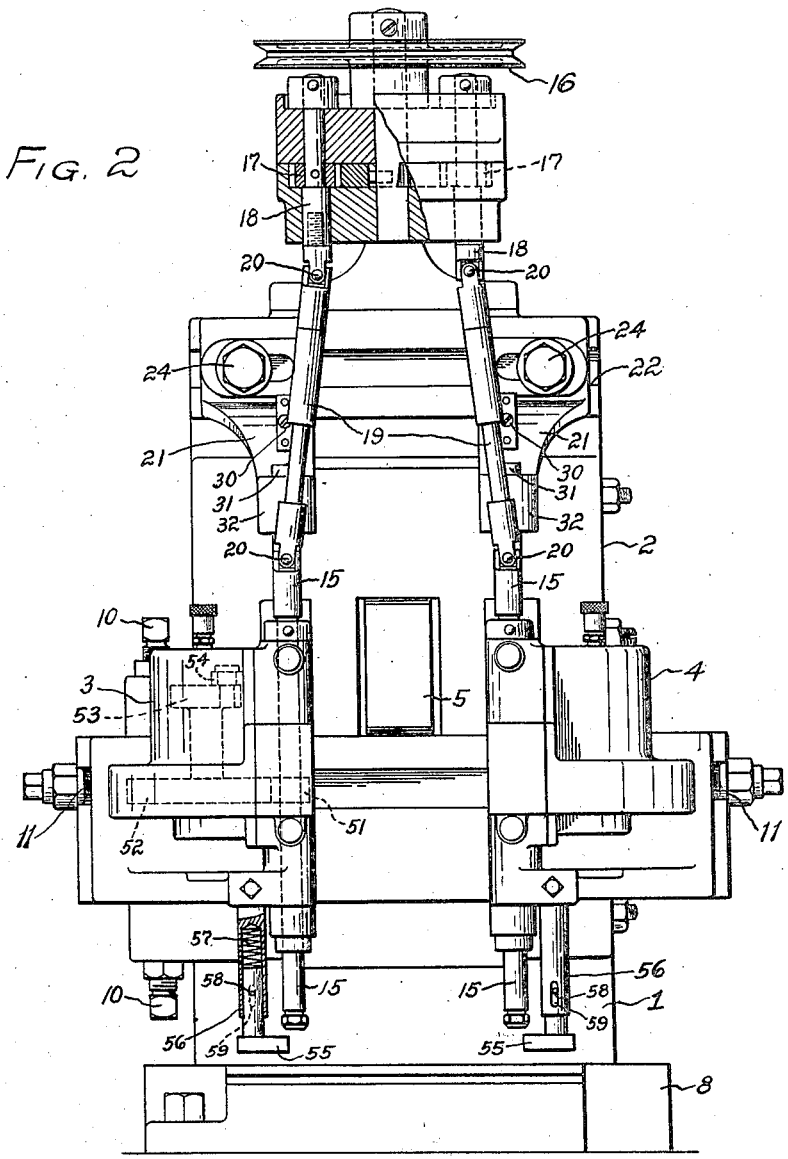
FIG. 2
FIG. 3
INVENTOR
William E. Primrose
BY
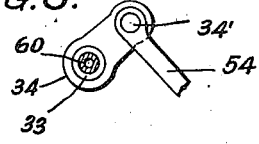
ATTORNEY Patented Sept. 18, 1923.

1,468,511

UNITED STATES PATENT OFFICE.

WILLIAM E. PRIMROSE, OF BRIDGEPORT, CONNECTICUT, ASSIGNOR TO CHALLENGE CUTLERY CORPORATION, OF BRIDGEPORT, CONNECTICUT, A CORPORATION OF CONNECTICUT.

WIRE FEEDING AND CUTTING-OFF MECHANISM.

Application filed January 31, 1921. Serial No. 441,241.

*To all whom it may concern:*

Be it known that I, WILLIAM E. PRIMROSE, a citizen of the United States, residing at 1661 Noble Ave., Bridgeport, county of Fairfield, State of Connecticut, have invented an Improvement in Wire Feeding and Cutting-Off Mechanism, of which the following is a specification.

This invention relates to machines for drilling and pinning scales and linings on pocket knives and has for its object to facilitate the above mentioned operation. Heretofore, in the making of covers for knife blades, the scales and linings have been assembled and united by hand and drill press, this method requiring several distinct operations:—(1) assembling the scale and lining preparatory to drilling; (2) drilling a hole for a pin; (3) drilling a second hole for the opposite pin; (4) countersinking these holes; (5) inserting and snipping a pin in the first hole; and (6) repeating the operation on a pin in the second hole. My invention combines these several operations into one semi-automatic machine operation.

In carrying out my invention I have devised an apparatus in which the holes in each end of the assembled cover are drilled in a single operation and at the same time the wires are inserted in the holes of another cover, previously drilled. The same movement which effects the advance of the drills is also utilized both to feed the wires that are being inserted and to cut off the wires when the proper length has been fed. To accomplish this I employ two separate drills and two wire feed devices all of which are operated simultaneously as hereinafter set forth. With the above and other objects in view I have devised a machine which will now be described, the novel features of which will be pointed out in the appended claims.

In the accompanying drawings,—

Figure 2 is a front elevation thereof, and

Figure 3 is a plan view of a portion of the wire spindle oscillating mechanism.

Figure 1:
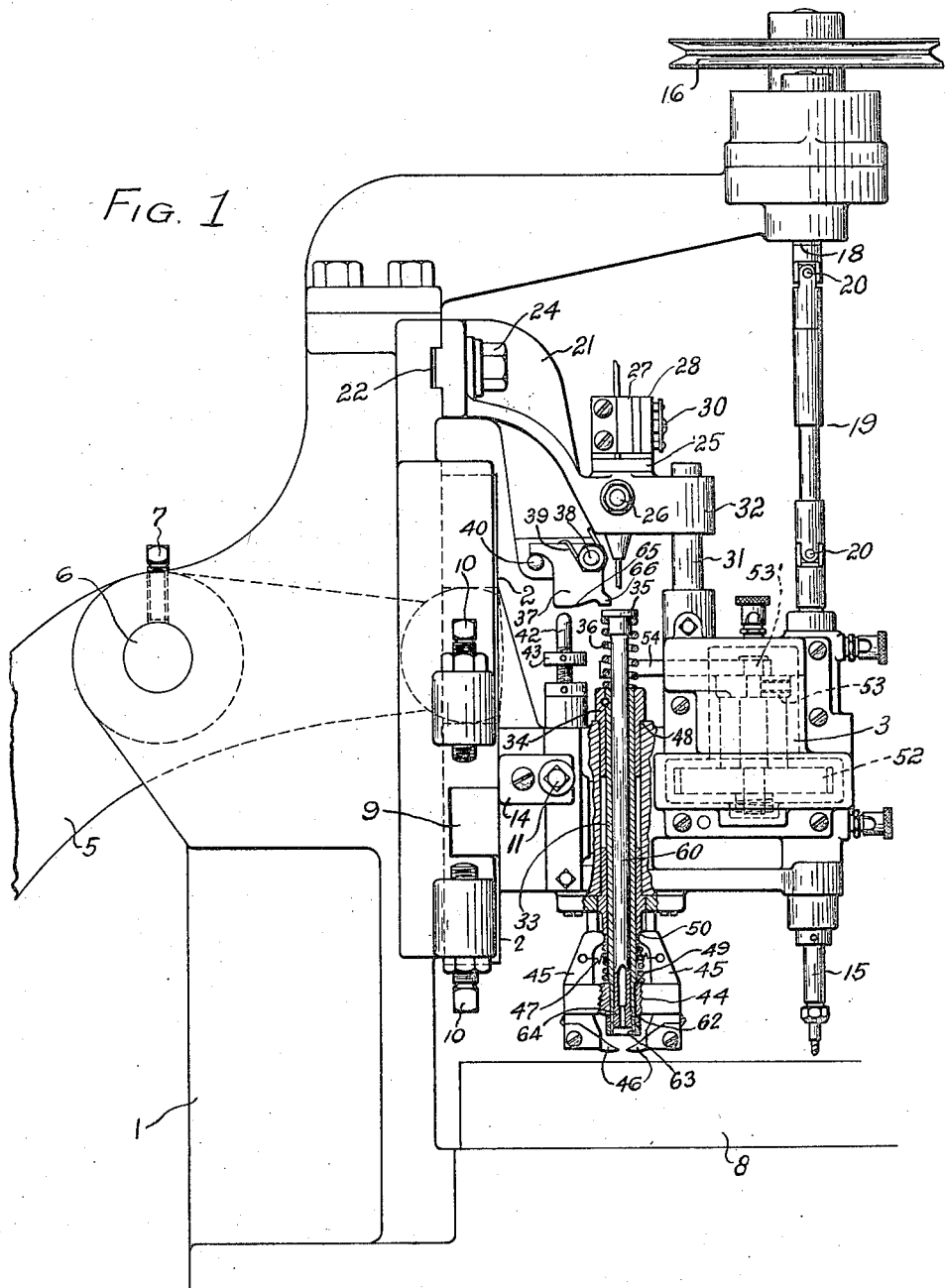
Figure 1 is a side elevation of the machine showing certain parts in section.

1 denotes the frame of the machine which is bolted of otherwise suitably secured to a work-bench or other suitable foundation. Frame 1 is provided with a guide-way in which travels a slide 2. Attached to slide 2 is left-hand spindle head 3 and righthand spindle head 4 which are similar to each other in all respects except that they are right and left handed. Slide 2 is actuated by a foot lever 5 pivoted as at 6 in the frame 1. The foot lever, which is the actuating mechanism for the slide, engages it with cylindrical faces working in a rectangular hole in the slide. Pivot 6 is retained from endwise movement by a set screw 7. Frame 1 is provided with base 8 for a rotatable table which holds the work. The movement of slide 2 is limited by stop lug 9 on slide 2 which engages adjustable stop screws 10 on frame 1. Spindle heads 3, 4, are transversely adjustable in slide 2 by means of adjustment screws 11 in brackets 14. Each of the spindle heads 3, 4, is provided with a drill spindle 15 which are both simultaneously driven from a single pulley 16 through gears 17 which drive shafts 18. Telescoping coupling members 19 are universally jointed at their ends 20 to spindles 15 and shafts 18 respectively, and furnish means for driving spindles 15.

Above spindle heads 3, 4, are located upper wire feed brackets 21 which are transversely adjustable in frame 1 by means of a tongue and groove arrangement shown at 22 and which may be secured in any desired position by means of a clamping screw 24. Each of the two brackets 21 is provided with a tension bracket 25 which is free to rotate in bracket 21 but is prevented from longitudinal movement therein by a retaining screw 26. Each of the brackets 25 is provided with tension blocks 27 and 28, an adjustment screw 30 being provided for tightening up tension blocks 27, 28 upon the wire. While brackets 21 may be clamped by screw 24, it is ordinarily desirable to maintain them in alignment with the wire feed spindles 33. For this purpose spindle heads 3, 4, are each provided with a pin 31, which fits in extension 32 of brackets 21, and is long enough to accommodate reciprocation of the head.

Each wire feed spindle 33 is provided with a collar 34 which is fixed upon the spindle by welding or brazing or other suitable means. At the lower end of the spindle 33 is provided a wire gripping spring-chuck which is actuated by the collar 35 secured to the upper end of a tubular rod 60 through which the wire passes. The lower end of this rod 60 is split and this split portion is tapered at 62, this tapered portion coacting with the taper 63 in the lower end of spindle 33 so that as rod 60 is moved upwardly by action of spring 36 on collar 35 the segments 64 of the split end of rod 60 are clamped around the wire as will be obvious. Release of the wire is effected by means of a latch 37 pivoted to bracket 21 at 38. Spring 39 holds latch 37 against a stop pin 40 in which position the latch will engage collar 35 on the upward movement of spindle 33 and prevent upward movement of rod 60 and the split gripping portion at the lower end thereof so that as sleeve or spindle 33 moves upwardly the tapered portion 63 moves away from tapered portion 62 allowing the spring segments 64 to move away from the wire and release the same. The latch 37 is disengaged from collar 35 upon further upward movement of the spindle bracket by means of a tripper 42 which contacts with the lower edge of the latch at 65 and rotates this latch clock wise, as viewed in Fig. 1, on its pivot 38 and withdraws lug 66 from the path of collar 35 allowing spring 36 to raise rod 60 and clamp segments 64 about the wire as above mentioned. The tripper 42 is adjustable and is secured at any desired position by means of lock nut 43.

On the lower end of spindle 33 is a slidable collar 44 having pivoted thereupon a pair of oppositely disposed levers 45, the lower ends of which extend beyond the end of the spindle and in their inner sides are provided with a pair of snips 46 for cutting the wire. The upper ends of levers 45 are connected by a tension spring 47 tending normally to hold the snips apart. The downward movement of spindles 33 with relation to the spindle heads 3, 4, is limited by means of a shoulder 48 on the collar 34. A spring 49 normally holds shoulder 48 in engagement with the upper surface of the spindle head. As the spindle head descends or advances the wire is fed to the knife handles which have been assembled and drilled to receive the wire. The lower ends of levers 45 come into contact with the knife handles and their downward motion is thereby arrested. The spindle head continues to advance compressing spring 49. Annular shoulders 50 engage the upper ends of levers 45 and by a camming action separate them against the tension of spring 47 thereby cutting the wire.

To facilitate the entry and passage of the wires through the drilled linings and scales and to prevent chipping of the scales at the edges of the holes, rotary oscillatory motion is given to each of the wire spindles. Spur gears 51 on drill spindles 15 drive the spur gears 52 which are keyed to the spindles of crank plates 53. Connecting rods 54 extend from the crank plates to pins 34' carried by collar 34, thus converting rotary motion of the drill spindles to oscillatory motion on the wire spindles, due to the crank pins 53' on the crank plates having smaller arcs of motion than the pins 34' on the brackets. The pins 34' on the extensions are made sufficiently long to allow for their sliding through their bearings in the connecting rods as these parts change their relative positions in the operation of the machine. The connecting rods are guided in a horizontal plane by engaging slots in the spindle heads.

While the knife covers are being drilled they are held down by means of a presser foot 55 at each end of the knife, there being a presser foot 55 for each of the spindle heads 3, 4. Presser foot 55 slides vertically in hollow pin 56 and exerts a downward pressure by means of spring 57. It is retained within pin 56 by means of a pin 58 integral with pressure foot 55 extending through slot 59 in pin 56. The compression of springs 57 is sufficient to hold the assembled linings and scales in place as the drills are being withdrawn.

In my prior Patent No. 1,367,831, entitled "Drilling and pinning on machine for pocket knife, scales and linings," dated February 8, 1921, is a disclosure of a table suitable for use with the present machine. Four grooves are cut in the surface of the table to accommodate the burrs and protruding drills and pins. Two handles are inserted in the table to rotate it. A work plate extends outward from the front of the table and on this the covers are assembled and slid into the holders. A plate beneath the work plate engages a groove in the table and holds it against upward forces in withdrawing the drills.

In operating the machine the assembled parts are pushed forward into a holding device stationed toward the front of the table. The foot lever is now pushed forward, first by a quick motion bringing the drills to work, then by a steady motion while the drills are working, and last by a sharp thrust to cut off the pins. It is during this downward stroke of the spindle heads and associated parts that the hands are free to assemble new parts for the covers. The foot is withdrawn, carefully at first, to be sure the drills do not stick, and then rapidly. In starting to work on an empty machine, a cover is first paced in the holder toward the front and the foot lever is put through a journey to drill the cover. The table is now revolved a full half turn and pressed back against the stop. New parts are inserted in the holder now at the front of the table, and on the next journey of the foot lever the drilled parts in the holder at the back of the table are pinned and the new parts drilled. After the next half turn of the table the pinned cover is pushed out of the front holder and through the rectangular recess in the table by other new parts being inserted in position for drilling. It is apparent that the operation is a continuous one. The ends of the pins in the covers are riveted by a separate operation forming no part of the present invetnion.

There are two sources of motion on the machine, (1) the foot lever, and (2) the drive pulley. The foot lever raises and lowers the spindle heads and their associated spindle mechanism, certain parts of the mechanism being capable of small independent sliding motions. The drive pulley rotates the drill spindles and through the medium of the gearings 51 and 52 and connecting rods 54 gives the desired oscillatory movement to the wire spindles.

The tension blocks 27 and 28 and their brackets 25 do not slide, but are rotatably mounted upon wire feed brackets 21. The wires are threaded down through the tension blocks, and the wire spindles 33. Starting at the top of a stroke a push on the foot lever moves the spindle heads downward, the spring-chucks gripping the wires and carrying them downward through the tension blocks. These feeding movements, assisted by the oscillation of the wire spindles, thrust the ends of the wires through the drilled holes in the covers until the jaws of the snips rest on the covers. Thus the motion of the wire spindles, trunnions, spring-chucks and the wires held by them is arrested, but the spindle heads continue downward by a sharp thrust in the foot lever, forcing the bevelled shoulders of the collars 50 between the arms of the levers carrying the snips, thereby closing the jaws and snipping the wires while they are in resting position. On the return stroke the spindle heads begin to move up first, the wire spindles, pivot blocks and wires remaining at rest on account of pressure of spring 49 until shoulders 48 are engaged by the upper faces of the spindle heads adjacent the spindle holes. The levers carrying the snips are at the same time being forced off of the shoulders 50 allowing the springs 47 to open the jaws. The spindles, picked up by the shoulders 48, now travel up with the spindle heads, and collars 35 are arrested by latches 37, disengaging the spring-chucks and releasing the wires, which are now held stationary by the sliding resistance of the tension blocks. After a measured length of the upward or return travel of spindle heads 3 and 4 has been completed, tripper 42 trips latch 37 permitting spring 36 to force collar 35 upon the spring-chuck and grip the wire. The wire is now carried up against the slight resistance of the tension blocks for the remainder of the stroke. Tripper 42 being adjustable, the amount of feed may be varied as desired.

The drill spindles are driven by a round belt at a speed of approximately 2200 R. P. M. The drills are inserted in the chucks to the proper distances for piercing the work and the spring jaws of the chucks are ground to angular cutting edges to act as countersinks. As the spindle heads are depressed, the drills are rotated and forced through the covers. As the drills break through the spindles are advanced by springs. This prevents the scales from chipping and also removes the burr on the upper surfaces by slightly contersinking with the chuck points, thus producing clean drilled holes. Further, cushions are afforded to rest the drill spindles until the wires have been snipped.

This application is a continuation in part of my application Serial No. 344,879, entitled "Drilling and pinning on machine for pocket knife, scales and linings," filed December 15, 1919, which has matured into Patent No. 1,367,831, dated February 8, 1921.

I claim—

1. A machine of the character described, comprising a reciprocating head, actuating means therefor, means carried by the head normally gripping the wire, a fixed support, a latch pivoted to said support for releasing said gripping means from the wire on the return travel of the head, and an adjustable tripper carried by the head for tripping said latch after a measured portion of said return travel of the head has been completed, thereby permitting said gripping means to re-engage said wire.

2. A machine of the character described, comprising a reciprocating head, actuating means therefor, a hollow spindle for threading the wire therethrough carried by said head, a spring chuck for gripping said wire carried on the end of said spindle, a collar slidably carried on said spindle for actuating said chuck, a spring carried on said spindle bearing on said collar for normally holding said chuck in gripping position, and means for holding said collar stationary over a measured travel of the head in one direction, thereby permitting said chuck to release the wire.

3. A machine of the character described, comprising a reciprocating head, actuating means therefor, a hollow spindle for threading the wire therethrough carried by said head, a spring chuck for gripping said wire carried on the end of said spindle, a collar slidably carried on said spindle for actuating said chuck, a spring carried on said spindle bearing on said collar for normally holding said chuck in gripping position, a fixed support, a latch pivoted to said support for holding said collar stationary as the head travels in one direction, thus permitting the chuck to release the wire, and an adjustable tripper carried by said head for tripping said latch after a measured length of travel has been completed by the head, thereby releasing said spring and causing said chuck to grip the wire.

4. A machine of the character described, comprising a reciprocating head, actuating means for the same, a wire cutter, means for yieldingly carrying said wire cutter by said head, a stop for said wire cutter, and means actuated by the advance of said head after said wire cutter has been stopped, for actuating the latter.

5. A machine of the character described, comprising a reciprocating spindle head, actuating means therefor, a hollow spindle for threading the wire therethrough carried by and extending beyond said head, means carried by said spindle for pivoting two oppositely disposed levers thereupon, one pair of ends of said levers extending beyond the end of said spindle and provided with opposed snips on their inner faces, a tension spring connecting the other pair of ends of said levers, a spring normally holding said levers away from said head, stop means for said levers as the head advances, and camming means carried by the head as the same advances with respect to the levers for separating the spring connected ends of the same and thus actuating the snips.

6. A machine of the character described, comprising a reciprocating head, actuating means therefor, means carried by said head for gripping a wire during the advance travel of said head, means for releasing said gripping means from the wire on the return travel of said head, and means carried by said head and actuated by the movement thereof for cutting said wire at the end of each advance.

7. A machine of the character described, comprising a reciprocating head, actuating means therefor, means carried by said head for gripping a wire during the advance travel of said head, adjustable means for releasing said gripping means from the wire on the return travel of said head, means for holding the wire stationary while the head is moving in the vicinity of its most advanced position, and means actuated by the movement of the head for cutting the wire while the same is so held.

8. A machine of the character described, comprising a reciprocating spindle head, actuating means therefor, a hollow spindle slidably carried in said head, stop means for limiting the movement of said spindle relative to said head, a spring normally holding said stop means in engagement, wire gripping means on one end of said spindle, means disengaging said wire gripping means from the wire over a measured portion of the return travel of the spindle, wire cutting means on the opposite end of the spindle, means for stopping the advance of said spindle before the completion of the advance of said head, and means actuated by the movement of said head for actuating said cutting means while the spindle is stationary.

9. A machine of the character described, comprising a reciprocating head, actuating means therefor, wire gripping means on said head for feeding the wire during the advance travel of the head, means for releasing said gripping means from the wire on the return travel of the head, and stationary means frictionally holding the wire to prevent movement of the latter except in response to said gripping means.

10. A machine of the character described, comprising a frame having a fixed guideway, a slide reciprocating in said guideway, means for actuating said slide, a head carried by said slide, wire feeding means carried on the head, and means for transversely adjusting the head with respect to the slide.

11. A machine of the character described, comprising a frame having a guideway, a slide reciprocating in said guideway, means for actuating said slide, a head, transversely adjustable means for securing said head to said slide, wire gripping means carried upon said head, means actuating said wire grippings means to advance the wire, a tension bracket, transversely adjustable means for securing said bracket to said frame, and means for transversely adjusting said bracket in unison with said slide.

12. A machine of the character described, comprising a frame having a guideway, a slide reciprocating in said guideway, means for actuating said slide, a head, transversely adjustable means for securing said head to said slide, a bracket, transversely adjustable means for securing said bracket to said frame, means carried by said head and said bracket for advancing the wire, and means for transversely adjusting said bracket, in unison with said slide.

13. In combination with a reciprocating head and a stationary bracket, means for transversely adjusting said head, and means for transversely adjusting said bracket in unison with said head.

14. In a machine of the character described, a frame carrying a vertical slide to which right and left spindle heads are adjustably attached for transverse movements, and carrying a wire feed bracket in alignment with each spindle head, each of said brackets being transversely adjustable in unison with its respective spindle head.

15. A machine of the character described, comprising right and left reciprocating heads each carrying a drill spindle and a wire spindle, a drive pulley, and a common driving means for said drill spindles.

16. A machine of the character described, comprising right and left reciprocating heads adjustable toward and from each other and carrying drill and wire spindles, a drive pulley, and means for driving each of said drill spindles from said drive pulley.

17. In a machine of the character specified, a frame carrying a vertical slide to which right and left spindle heads are adjustably attached for transverse movements, and also adjustably carrying transversely adjustable wire feed brackets.

18. In a machine of the character described, the combination of a spindle head with a collar projecting below its lower surface and carrying a circumferential shoulder, and a wire spindle slidable through the collar and carrying a trunnion with levers and snips, whereby a downward thrust on the spindle head after the wire spindle has reached its lowermost position forces the shoulder to spread the levers and operate the snips.

19. A machine of the character described, comprising right and left reciprocating spindle heads each carrying a drill spindle and a wire spindle, and a spring pressed presser foot on each spindle for holding down the work as the drills are withdrawn.

20. A machine of the character described, comprising right and left reciprocating spindle heads each carrying a drill spindle and a wire spindle, a revoluble table having means for holding the work against transverse movement, and a spring pressed presser foot on each spindle head for holding the work down as the drills are withdrawn.

21. A machine of the character described, comprising a reciprocating spindle head carrying a drill spindle and a wire spindle, and means for holding knife covers to be drilled and wired comprising a table and means carried by the spindle head coacting therewith.

22. A machine of the character described, comprising a reciprocating spindle head carrying a drill spindle, a presser foot adjacent thereto, and a wire spindle, and means for holding the knife covers to be drilled and wired comprising a table and means carried by the spindle head coacting therewith.

23. In a machine of the character described, a frame carrying a vertical slide to which right and left spindle heads are adjustably attached for transverse movements and also carrying transversely adjustable right and left wire feed brackets, in combination with work holding means.

24. In a machine of the character described, a frame carrying a vertical slide having right and left spindle heads adjustably attached thereto for transverse movements, and also carrying right and left wire feed brackets adjustably attached for transverse movements, in combination with a revoluble table having a plurality of holding devices adjustably located thereon, the right and left spindle heads, the right and left wire brackets, and the holding devices being adjustable to alignment.

In testimony whereof I affix my signature.

WILLIAM E. PRIMROSE.